May 4, 1926.

H. H. WESTINGHOUSE

VENTILATED FOOD RECEPTACLE

Filed May 18, 1922

1,583,211

Inventor
H. H. Westinghouse
By Attorney
Edward A. Wright

Patented May 4, 1926.

1,583,211

UNITED STATES PATENT OFFICE.

HENRY H. WESTINGHOUSE, OF NEW YORK, N. Y.

VENTILATED FOOD RECEPTACLE.

Application filed May 18, 1922. Serial No. 561,814.

*To all whom it may concern:*

Be it known that I, HENRY HERMAN WESTINGHOUSE, a citizen of the United States, residing at the city, county, and State of New York, have invented a certain new and useful Improvement in Ventilated Food Receptacles, of which improvement the following is a specification.

This invention relates to receptacles for containing foodstuff, such as fruit and vegetables, and has for its object to provide a container for this purpose which shall be of simple and inexpensive construction; shall afford a free circulation of air for ventilation, and may be easily cleaned.

Figure 2:
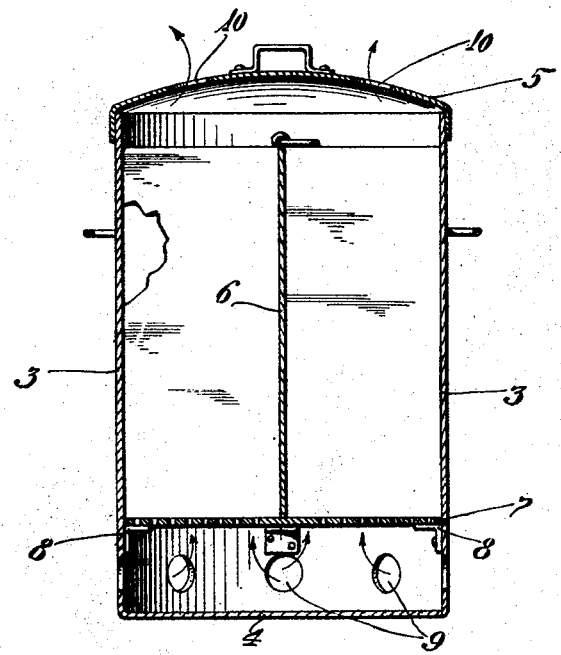
Figure 1:
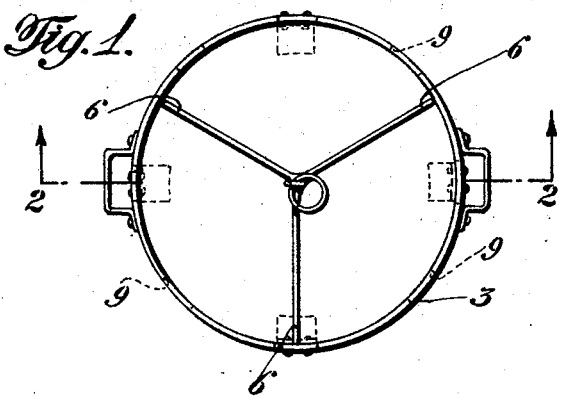

In the accompanying drawing: Figure 1 is a plan view, with cover removed; and, Fig. 2, a vertical section, taken on the line 2—2 of Fig. 1, and showing one form of food receptacle embodying my improvement.

In the practice of my invention, the receptacle or container may be of any suitable size or shape convenient to handle, such for instance, as about two or three feet wide by three to four feet high, and as shown in the drawing, the main body of the container may comprise a cylindrical metal can having vertical side walls, 3, with a bottom, 4, and a removable cover, 5. The space within the container is divided into a plurality of compartments by means of vertical partitions, 6, the bottom of said compartments being defined by a removable perforated horizontal plate or partition, 7, which may rest upon bracket lugs, 8, fastened to the interior of the walls of the container near the bottom. The vertical partitions preferably extend substantially the full height of the container, whereby each food compartment is accessible from the top without interfering with other compartments. The space beneath the perforated plate, 7, communicates with the outside atmosphere through a series of openings, 9, for the entrance of air, and outlet openings are provided at the upper part of the container, as indicated at 10, in the cover, 5.

This construction provides for a complete ventilation for the container, as the air is free to enter through the openings, 9, at the bottom and pass upward through the perforated plate, 7, and the food compartments to the top of the container and out through the openings, 10. This circulation of air assists in preserving the fruit, vegetables, or other foodstuffs, since in case there is any tendency for the mass to heat or gather moisture, the ventilation afforded will have the effect to keep the foodstuffs dry and cool.

The vertical partitions are preferably arranged radially and are readily removable, so that the container may be easily cleaned at any time by simply taking out all partitions and turning the container upside down.

Having now described my invention, what I claim as new and desire to secure by Letters Patent is:

1. A food receptacle comprising a metallic container having a closed bottom and side walls provided with air inlet openings, a removable perforated plate supported in said container above said air inlet openings and forming a dry chamber between said plate and said closed bottom, a separately removable member having vertical partitions extending substantially the full height of the container to divide the container into a plurality of food compartments and supported by said removable plate, and a removable cover for said container having air outlet openings.

2. A food receptacle comprising a metallic container having a closed bottom and side walls provided with air inlet openings, a removable perforated plate supported in said container above said air inlet openings and forming a dry chamber between said plate and said closed bottom, and a separately removable member having vertical partitions extending substantially the full height of the container to divide the container into a plurality of food compartments and supported by said removable plate.

In testimony whereof I have hereunto set my hand.

H. H. WESTINGHOUSE.